(12) United States Patent
Schulz et al.

(10) Patent No.: US 6,239,065 B1
(45) Date of Patent: May 29, 2001

(54) PROCESS FOR THE PREPARATION OF A SUPPORTED CATALYST

(75) Inventors: Robert Schulz, Ste-Julie; Guy Lalande; Marie-Chantal Denis, both of Montréal; Jean-Pol Dödelet, Ste-Julie, all of (CA)

(73) Assignee: Hydro-Quebec, Montreal (CA)

( * ) Notice: Subject to any disclaimer, the term of this patent is extended or adjusted under 35 U.S.C. 154(b) by 0 days.

(21) Appl. No.: 09/218,138

(22) Filed: Dec. 22, 1998

(51) Int. Cl.$^7$ ....................................... B01J 23/38
(52) U.S. Cl. ................. 502/337; 502/325; 502/339; 502/344; 502/347
(58) Field of Search ................. 502/182, 184, 502/185, 326, 337, 339, 344, 347, 177, 325

(56) References Cited

U.S. PATENT DOCUMENTS

| 1,638,190 | | 5/1927 | Raney . |
| 4,186,110 | * | 1/1980 | Jalan et al. . |
| 4,409,129 | * | 10/1983 | Takeuchi et al. . |
| 5,872,074 | * | 2/1999 | Schulz et al. . |
| 5,876,867 | * | 3/1999 | Itoh et al. . |
| 5,939,220 | * | 8/1999 | Gunner et al. . |

FOREIGN PATENT DOCUMENTS

| 734 765 | 10/1996 | (EP) . |
| WO 98/32885 | 7/1998 | (WO) . |

OTHER PUBLICATIONS

R. Schultz et al., "A novel method to produce nanocrystalline metastable supported catalysts", Cat. Ltrs. 35 (1995), pp. 89–106.

E. Ivanov et al., "Structural and magnetic properties of non–eequilibrium b.c.c. . . . ", J. Alloys and Compounds, 185 (1992), pp. 25–34.

Y. Chen et al., "Production of rutile from ilmenite by room temperature ball–milling–induced sulphurisation reaction", J. Alloys and Compounds 245 (1996), pp. 54–58.

Abstract only, JP 9–30198878, Ultrafine Particle Silver Contain Alloy Catalyst Contain Silver Platinum Alloy, Jan. 1995.

* cited by examiner

Primary Examiner—Tom Dunn
Assistant Examiner—Christina Ildebrando
(74) Attorney, Agent, or Firm—Foley & Lardner

(57) ABSTRACT

The invention is concerned with a process for the preparation of a supported catalyst having a nanocrystalline structure and a surface area preferably higher than 2 $m^2/g$. The process comprises preparing by mechanical grinding a nanocrystalline material consisting of a metastable composite or alloy of at least two different elements or compounds containing at least one catalytic species and subjecting the nanocrystalline material to leaching with a leaching solution in order to eliminate totally or partially at least of one of the two elements or compounds, other than the at least one catalytic species. At least one further element or compound that is non-leachable and that acts as a support for the at least one catalytic species is added to the material during the grinding step or to the leaching solution during the leaching step.

15 Claims, 16 Drawing Sheets

PROCESS FOR THE PREPARATION OF A SUPPORTED CATALYST

FIELD OF THE INVENTION

The present invention relates to a process for the preparation of a supported catalyst having a nanocrystalline structure and a high specific surface, which process makes use of an intensive mechanical grinding step combined with a leaching step.

The invention also relates to the so-prepared, supported catalyst.

The invention further relates to the use of such a supported catalyst as an electrocatalyst in a fuel cell or in an electrolyser.

By the expression "nanocrystalline structure", there is meant a crystalline structure having a grain size lower than 100 nm.

BRIEF DESCRIPTION OF THE PRIOR ART

"Raney" catalysts have been known for a very long time. As a matter of fact, U.S. Pat. No. 1,628,190 issued on May 10, 1927 in the name of Murray RANEY discloses a process for preparing a finely divided powder of Ni, which consists in melting together a mixture of Ni, Al and Si. After completion of the mixture, Al and Si are leached by treatment of the alloy with a caustic solution, thereby leaving only Ni in the form of a porous or finely divided powder.

Some inventors have also suggested to combine the Raney process with an intensive mechanical grinding in order to obtain porous Ni. Thus, by way of example, the article published in *J. Alloys and Compounds*, vol. 185, (1992), pp. 25–34, disclosed a process wherein a $Ni_{35}Al_{65}$ is prepared by a mechanical grinding and this alloy is then leached with a solution of 20% KOH in order to dissolve Al.

In European laid-open patent application EP-0,734,765-A1 (1996), reference is made to the use of the above process for the preparation of alloys other than Ni-based alloys. As a matter of fact, in this laid-open application, the alloy manufactured by mechanical grinding is of the formula Al—Me—X where Me is a metal selected from the group consisting of Ni, Co, Fe, Cu, Pd and Ag, and X is different from Me and consists of at least one metal selected from the group consisting of Ag, Co, Pt, Ti, V, Fe, Cu, Zn, Ge, W, Re, Os, Ir, Au, Zr, Nb, Mo, Ru, Rh, Pd, Cd, In, Sn and Sb. After the alloy has been prepared, Al is leached.

All these processes of preparation make use of a combination of elements that are exclusively metallic, thereby generating some problems during the mechanical grinding step. Indeed, metals are subject to cold welding during the process, because of the creation of fresh metal surfaces during the grinding step. Therefore, it becomes difficult to operate the grinding machine without having sticking problems, and to reduce the aggregation of crystallites in order to facilitate their separation and increase the specific surface of the final product. Therefore, it is advantageous to use, as a starting material, at least one non-metallic compound. This compound can be, for example, a metal oxide and can be part of either the catalytic component or of the leachable component.

In international patent application WO 98/32885 published in the name of the Applicant, there is disclosed a process for the preparation of nanocrystalline materials having a high specific surface. The process comprises a first step consisting in mixing the elements of the alloy with other elements acting as dispersing agents. All these elements are subjected together to an intensive mechanical grinding, a fast quenching from the melt or any alternative step, in order to generate a nanocrystalline material. In a second step, the nanocrystalline material is leached in order to totally or partially dissolve the dispersing agents in a leaching solution. The resulting product still has a nanocrystalline structure in addition of having a high porosity thanks to the dissolution of the dispersing agent. Its specific surface is considerably increased and such in turn increases the catalytic properties of the material.

It is worth mentioning that the morphology of the resulting material is similar to the one of a sponge that would have nanometric pores. In the field of catalysis, the species (gas or solvated ions) that must chemically react with each other must stay for a given time on the surface of the catalyst in order to obtain the requested catalytic effect. Therefore, the amount of species that will react as a function of time which is the reaction speed, will be directly related to the available surface of the catalyst. Of course, this available surface is substantially increased if use is made of a nanometric sponge. However, it is also important that the species reach or leave (depending on the chemical reaction) quickly the catalytic surface. This may be a problem if the species have to travel for long time through nanometric channels in the sponge in order to reach internal surfaces. In fact, it is highly probable that the internal surface will be of very small use if the speed of transportation of the species is lower than the reaction speed. Thus, most of the materials forming the heart of the sponge, could be used very little during the catalytic reaction. In the case where the material comprises noble metals such as Pt or Pd, it becomes advantageous to fragment the sponge and disperse the fragments that are so-obtained onto a support in order to maximize their use and therefore reduce the costs and amount of noble metals that are needed.

SUMMARY OF THE INVENTION

The present invention proposes a solution to the problem mentioned hereinabove.

More particularly, the invention proposes a process in which, during the preparation (synthesis) of the nanocrystalline material, chemical elements or compounds that are not soluble by leaching and which do not mainly contribute to catalysis are incorporated into the material in order to provide a support for the catalytic elements or compounds. By way of example, an intensive mechanical grinding of Pt+Ru+MgO can be carried out. Once obtained, the ground mixture can be grounded for a second time with a substantial amount of carbon black. Leaching is then carried out and a catalyst of Pt—Ru supported onto carbon black is obtained. The support which, in the above example, is carbon black, can also be incorporated to the material at a different step of the process, such as during the leaching step. In such a case, the mixture of Pt+Ru+MgO will be grounded and then leached in a solution containing a sufficient amount of carbon black, on which the remaining Pt—Ru will be deposited while MgO is dissolved.

Such a use of a chemical element or compound that is not leachable permits to increase the separation of the particles and nanocristallities and therefore to increase the active surface of the catalyst. Thus, the process according to the invention permits to reduce the amount of species that act as catalysts, species which are often very expensive. On this basis, a first object of the present invention as claimed hereinafter is to provide a process for the preparation of a supported catalyst having a nanocrystalline structure and a high specific surface area, comprising:

in a first step, preparing a nanocrystalline material consisting of a metastable composite or alloy of at least two different chemical elements or compounds containing at least one catalytic species, the so-prepared material having a nanocrystalline structure with crystallites of a size lower than 100 nm; and in a second step, subjecting the nanocrystalline material to leaching with a leaching solution in order to eliminate totally or partially at least one of the elements or compounds of the material other than the at least one catalytic species, wherein at least one further chemical element or compound that is non-leachable and acts as a support for the at least one catalytic species, is added to the material during the first step or to the leaching solution during the second step.

The process according to the invention permits to obtain a supported catalyst in the form of a nanocomposite material, a solid solution, an intermetallic compound or a combination thereof, having a nanocrystalline structure and a high specific surface area that is usually higher than 2 $m^2/g$.

A second object of the present invention lies in such a supported catalyst. The catalyst that is so-produced can be used as electrocatalyst in electrolysers or incorporated into the electrodes of acid electrolyte fuel cells. More particularly, the catalyst can be used into a fuel cell having a solid polymeric electrolyte. Such fuel cells are particularly interesting as autonomous electric energy sources for stationary or non-stationary applications.

Therefore, a third object of the present invention lies in the use of the supported catalyst according to the invention having a nanocrystalline structure and a high specific surface area higher than 2 $m^2/g$, as an electrocatalyst in a fuel cell.

The invention permits to prepare catalysts of very complex structure, whose performances are comparable to or better than those of catalysts presently available. In particular, the invention permits to prepare supported catalysts of very complex structure, which cannot be obtained by conventional preparation processes. The invention also permits to manufacture CO tolerant electrocatalysts and/or electrocatalysts for the direct oxidation of methanol (direct methanol fuel cell).

The invention and its numerous advantages will be better understood upon reading the following non-restrictive description that will follow, made reference to the accompanying drawings and including a plurality of examples.

DETAILED AND NON-LIMITATIVE DESCRIPTION OF THE INVENTION

Figure 1A:
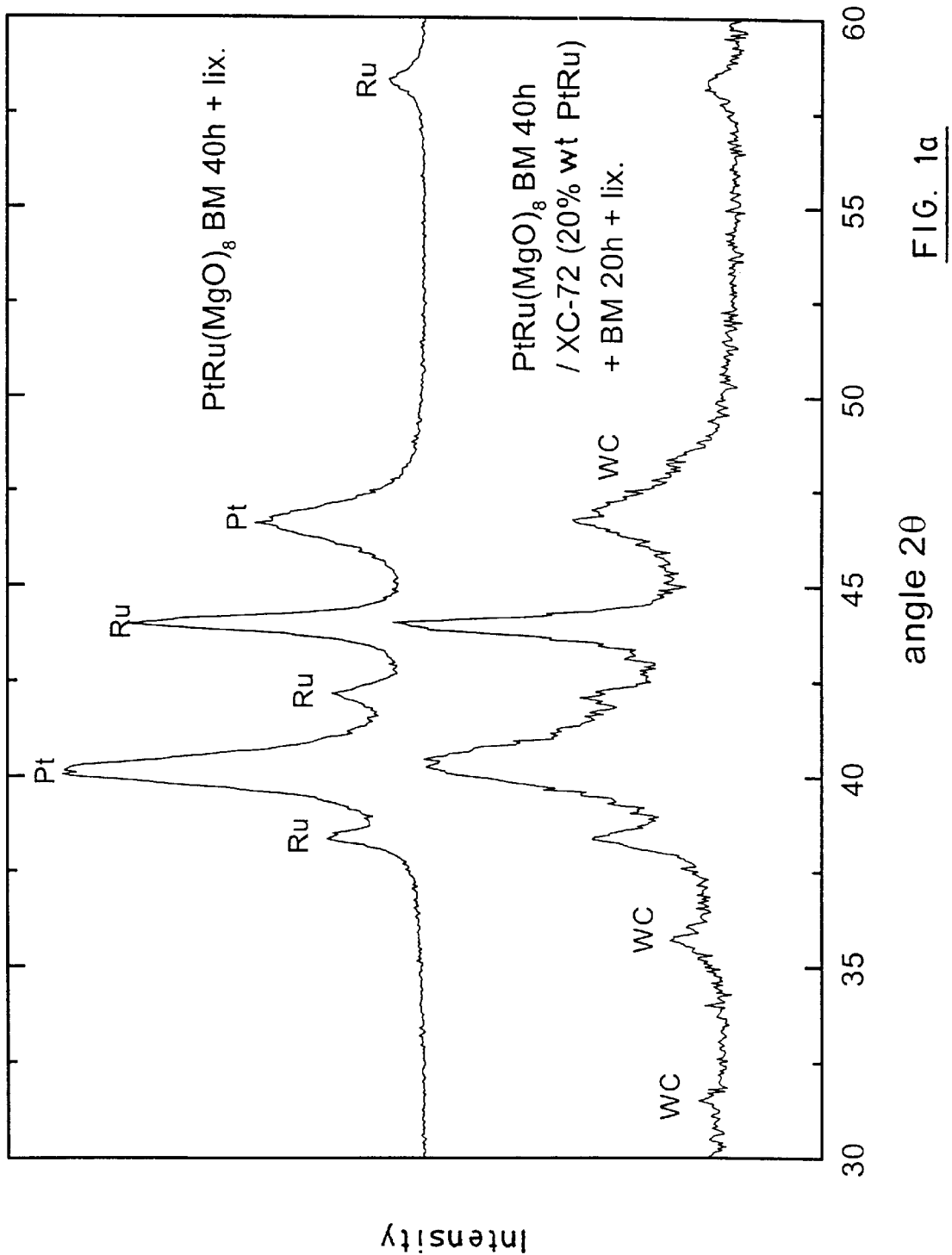
FIG. 1a is an X-ray diffraction diagram showing the Pt and Ru peaks of a Pt and Ru-containing catalyst prepared as described in comparative example 1, and the peaks of a catalyst of the same type supported on carbon black and prepared as described in example 3.

As previously indicated, the invention is concerned with a process for the preparation of supported catalyst having a nanocrystalline structure and a specific surface area preferably higher than 2 $m^2/g$, which comprises a first step consisting of an intensive mechanical grinding and a second step consisting of a leaching.

The chemical elements or compounds used as starting materials must play at least one of the following roles:
  i) to be a catalytic species, that is a catalyst or an electrocatalyst;
  ii) be a leachable dispersing agent; and
  iii) to be another dispersing agent that is non-leachable or non-soluble in the leaching solution, in order to act as a support for the catalytic species.

Preferably, the catalytic species that are used contain at least one element selected from the group consisting of Pd, Pt, Ir, Os, Au, Rh, Ag, Ru and Ni.

Preferably also, the non-leachable elements or compounds acting as a support are selected among those having a high specific surface and a high electronic conduction. By way of example of such chemical elements or compounds, reference can be made to carbon black, graphite, doped zeolite, pyrrolized polyacrylonitrile, carbides and conducting oxides.

Alternatively, the non-leachable chemical elements or compounds acting as a support can be selected among those having a high specific surface and a good ionic conduction. As examples of such elements or compounds, reference can be made to conductive ionomeric polymers and ion-conducting ceramics.

These non-leachable compounds or elements act as dispersing agents and supports for the catalytic species. They may also act as additives to improve the catalytic reaction and/or to improve the tolerance of the electrocatalytic material to CO (for example, $WO_3$ enhances the property of Pt).

In all cases, the elements or compounds acting as supports should preferably be used in such an amount that the molar concentration of said elements or compounds in the supported catalyst that is prepared is higher than 50%.

Preferably, the leachable elements or compounds used in the second step of the process comprise at least one non-metallic element selected from the group consisting of H, C, N, O, F, Cl, P and S. Leaching of said elements or compounds can be carried out by thermal decomposition or by reaction with another phase.

Alternatively, the leachable elements or compounds used in the second step are selected from the group consisting of, on the one hand, Mg, Li, Na, K, Ca, Ti, Zr and Zn and, on the other hand, H, C, N, O, F, Cl, P and S. Leaching of said elements or compounds can be carried out by thermal decomposition or by reaction with another phase.

In all cases, the leachable elements or compounds should have a molar concentration ranging between 2% and 95% with respect to all the chemical elements or compounds used in the process.

There are different ways of carrying out the process according to the invention, and more particularly the first step of it.

According to a first preferred embodiment of the invention, the nanocrystalline material is prepared in the form of a powder by mixing all the chemical elements or compounds used as starting materials, and subjecting all of said elements or compounds to a single intensive mechanical grinding.

In accordance with a second embodiment of the invention, all chemical elements or compounds used as starting materials are mixed together, except the element(s) or compound(s) acting as a support, in order to obtain a first mixture that is subjected to a first intensive mechanical grinding. Then, the element(s) or compound(s) acting as a support are added to obtain a second mixture that is subjected to a second intensive mechanical grinding.

In accordance with a third preferred embodiment of the invention, all the chemical elements and compounds used as starting materials except the element(s) or compound(s) acting as a support and the element(s) or compound(s) that are leachable, are mixed together in order to obtain a first mixture that is subjected to a first intensive mechanical grinding. Then, the leachable element(s) or compound(s) are added to the first mixture that is obtained after grinding in order to obtain a second mixture that is subjected to a second intensive mechanical grinding. Finally, the element(s) or compound(s) acting as a support are added to the second mixture that is obtained after grinding in order to obtain a third mixture that is subjected to a third intensive mechanical grinding.

Therefore, depending of the preferred embodiment that is elected, the first step comprises one, two or three successive grinding steps.

Once these grinding steps are completed, the second step of the process according to the invention is carried out. This second step consists in leaching the powder that was obtained in order to partially or totally dissolve the leachable element(s) or compound(s).

According to another preferred embodiment of the invention, the elements or compounds acting as a support can be added only during the second step via the leaching solution. In such a case, the leaching solution is subjected to a mechanical, magnetic or ultra-sonic stirring.

In all cases, the leachable and non-leachable elements or compounds used as starting materials can be grinded prior to being use.

As indicated hereinabove, the supported catalyst obtained by this process can be a nanocomposite, a solid solution, an intermetallic or a combination thereof. This catalyst can be made of several elements (i.e. a nanocomposite comprising $MoO_3+WO_3+PtRu+RuO_2+Pd$).

In accordance with the present invention, it has been discovered that the process according to the invention permits to obtain a supported catalyst consisting of crystallites having a size that is much smaller that the size of the crystallites obtained by the known processes mentioned in the preamble of the present description. Moreover, an excellent dispersion of the catalytic species onto the selected support is achieved, thereby allowing a substantial reduction in the amount of the usually expensive catalytic species that is required for the manufacture of a catalyst of a given efficiency.

COMPARATIVE EXAMPLE 1

Synthesis of Non-supported PtRu by Leaching

The process that was used for carrying out this example is the one broadly disclosed in international patent application No. WO98/32885 in the name of the Applicant.

In a crucible made of WC and containing 2, 3 or 4 balls also made of WC, Pt(−200 mesh, 99.98%), Ru(−325 mesh, 99.95%) and a leachable dispersing agent in an atomic ratio of 1:1:8 were ground under an argon atmosphere. Two leachable dispersing agents were used separately. These agents were as follows:

$MgH_2$(the resulting powder will be hereinafter identified $PtRu(MgH_2)_8BM40h$)

MgO (the resulting powder will be hereinafter identified $PtRu(MgO)_8BM40h$)

The total amount of powder to be ground was about 7 to 8 g and the number of balls was adjusted to amount to a weight of about 40 g. Thus, the weight ratio of the balls to the powder was about 5. The grinding was carried out for 40 hours, until no change is obserbved in the crystalline structure. Then, a leaching step was carried out onto the ground powder. For this purpose, the powder was poured into a 300 mL solution of HCl 1M and subjected to magnetic stirring for 8 hours or more. The resulting solution was then filtered by gravitation in a funnel provided with a filtering paper rinsed with distilled water and dried in a drying cup bowl under ambient air for 8 hours until all the water was evaporated.

COMPARATIVE EXAMPLE 2

Synthesis of PtRu Supported onto Carbon Black with no Leaching

The process that was used in this example is the one disclosed in the article of R. Schulz et al, "A novel method to produce nanocrystalline metastable supported catalysts", Catalysis Letters, Vol. 35 (1995) 89. In this article, there is disclosed a process in which a super-saturated solution of NiRu is prepared by intensive mechanical grinding and the resulting powder is then grounded with alumina to cause dispersion of NiRu onto the alumina.

The same process was used in this example to prepare an electrocatalyst based on PtRu. An alloy of PtRu was prepared by a first intensive mechanical grinding. This alloy was then subjected to a second intensive mechanical grinding in the presence of carbon black. The concentration of PtRu with respect to the carbon black was about 20% by weight.

More particularly, in a crucible made of WC and containing 2, 3 or 4 balls, also made of WC, Pt(−200 mesh, 99.98%) and Ru(−325 mesh, 99.95%) under an atomic ratio of 1:1 were ground under an argon atmosphere. The total amount of powder to be ground was about 7 to 8 g and the weight of the balls was about 40 g, for a weight ratio of the balls to the powder of about 5. This first grinding step was carried out for 40 hours. Then, 200 g of this powder (hereinafter identified PtRuBM40h) was placed into a crucible made of WC, with 800 mg of XC-72R carbon black. Two balls made of WC were used for this second grinding step. These two balls weighted 15 g. A second grinding of 20 hours was carried out under an argon atmosphere. The resulting powder will hereinafter be identified 20% PtRuBM40h/XC-72R.

EXAMPLE 3 ACCORDING TO THE INVENTION

Synthesis of PtRu Supported onto Carbon Black with Leaching

PtRu(MgO)$_8$BM40h was prepared as disclosed in comparative example 1, except that the obtained product was not leached immediately.

In a crucible made of WC and containing several balls also made of WC, the so-prepared PtRu(MgO)$_8$BM40h and carbon black (XC-72R) in a ratio corresponding to 20% by weight of PtRu with respect to the carbon black, were ground. The product obtained after grinding will hereinafter be called PtRu(MgO)$_8$BM-40h/XC-72R.

The total amount of powder to be ground was about 1.4 g and the number of balls was adjusted so that their total weight be equal to 15 g. The milling was carried out for 20 h. The powder once ground was poured into 300 mL of a solution of HCl 1M and subjected to magnetic stirring for 8 hours. The solution that was so obtained was filtered by gravitation in a funnel provided with a filtering paper, then rinsed with distilled water and dried in a drying cup bowl under ambient air for about 8 hours until all the water was evaporated.

EXAMPLE 4 ACCORDING TO THE INVENTION

Synthesis of PtRu Dispersed onto Carbon Black with Lixiviation

A powder of PtRu(MgO)$_8$BM40h was prepared as disclosed in example 1 except that, during the leaching step, carbon black was added to the solution of HCl 1M.

The powder of PtRu(MgO)$_8$BM40h was poured into the leaching solution so as to obtain a weight ratio of PtRu versus carbon black of about 20%. The product obtained in this example will hereinafter be called PtRu(MgO)$_8$BM40+XC-72R.

EXAMPLE 5 ACCORDING TO THE INVENTION

Synthesis of PtRu Dispersed onto WO$_3$ with Leaching

A powder of PtRu(MgH$_2$)$_8$BM40h was prepared as disclosed in example 1 hereinabove, except that the obtained product was not leached immediately. In a crucible made of WC and containing 2, 3 or 4 balls also made of WC, PtRu(MgH$_2$)$_8$BM40h and WO$_3$ in an atomic ratio of 1:1 were ground under an argon atmosphere. The obtained product will hereinafter be called PtRu(MgH$_2$)$_8$BM40h/WO$_3$.

The total amount of powder to be ground was about 7 g and the number of balls was selected so that the weight ratio of the balls to the powder be equal to about 6. The grinding step was carried out for 20 hours. Once ground, the powder was poured into 300 mL of a solution of HCl 1M and magnetically stirred during more than 8 hours. The obtained solution was filtered by gravitation in a funnel provided with a filtering paper, then rinsed with distilled water and dried under ambient air during 8 hours until the water was evaporated.

Comparative Analysis of the Exemplified Products

The advantage of the process according to the invention which combines an intensive mechanical grinding step with the leaching step is obvious in view of the data reported in the following table. These data include the results of measurements of the specific surface (BET) of the products carried out with an apparatus Autosorb-1® of Quantachrome Corporation. They also include the results of the measurements of the size of the crystallites obtained by X-ray diffraction (diffractometer Siemens D-500, Cukα), using the equation of Debye-Scherrer (R. D. Cullity, "*Elements of X-ray Diffraction*", Addison-Wesley Publishing Company, 1956, Reading, Mass., USA).

TABLE

| Sample | Specific surface ($m^2/g$) | Crystallite diameter (nm) |
|---|---|---|
| Commercial Products | | |
| Pt black(Alfa Aesar,Johnson-Matthey) | 44.3 | Pt: 5.0 |
| PtRu black(Alfa Aesar, Johnson-Matthey) | 63.2 | Pt: 6.3 |
| PtRuOx (E-Tek ®) | 145 | Pt: 3.6 |
| Pt/XC-72 20 wt % (E-Tek ®) | 156.52 | Pt: 2.7 |
| PtRu/XC-72 20 wt % (E-Tek ®) | 148.70 | Pt: 1.7 |
| Products without special treatment | | |
| Unground Ru | | Ru: 71.2 |
| Ru BM40h | | Ru: 10.2 |
| Unground Pt | | Pt: 70.1 |
| PtMN40h | 0.25 | Pt: 13.4 |
| PtRuBM40h | 0.45 | Pt: 10.5 |
| Non-supported catalysts (prior art, example 1) | | |
| PtRu(MgO)$_8$BM40h + lix. | 23.90 | Pt: 8.8 |
| | | Ru: 18.6 |
| PtRu(MgH$_2$)$_8$BM40h + lix. | 43.98 | Pt: 17.1 |
| | | Ru: 32.1 |
| Supported catalyst (prior art, example 2) | | |
| PtRuBM40h/XC-72 (20% wt PtRU/C) + BM20h | | Pt: 7.9 |
| Catalysts dispersed, supported and leached according to the invention | | |
| PtRu(MgO)$_8$BM40h/XC-72 (20% wts PtRu/C) + BM20h + lix. | 92.77 | Pt: 5.4 |
| | | Ru: 12.6 |
| PtRu(MgH$_2$)$_8$BM40H/WO$_3$ (1:1 at) + BM20h + lix. | 46.94 | Pt: 4.3 |
| | | Ru: 27.2 |

In this table, the measurement carried out on the commercial products are given as a reference. It is worth noting that these products consist of crystallites having a diameter lower than 10 nm, and have specific surfaces that are higher than 30 $m^2/g$.

The powders of Ru and Pt taken as such, that is not-ground, have crystallites of about 70 nm. Mechanical grinding for 40 hours of these powders under an argon atmosphere reduces the crystallites of Ru to 10.2 nm and the crystallites of Pt to 13.4 nm. However, the specific surface of the ground Pt is low (0.25 $m^2/g$. If Pt and Ru (1:1 at) are ground together for 40 hours under an argon atmosphere, the size of the crystallites is 10.5 nm and the specific surface is almost twice the specific surfaces of the ground Pt (0.45 m$^2$/g) even though it remains always very low. From these experiments, it can be deduced that the size of the crystallites is not proportional to the specific surface. Eventhough crystallites having a size of a few nanometers is an essential condition for the obtention of particles of similar dimension, there is a phenomena of "cold-welding" between the crystallites during the mechanical grinding, which increases the size of the particles.

By using the process of preparation disclosed in example 1which is illustrative of the prior art, one may increase the specific surface of the crystallites to a level higher than 20 m$^2$/g. For example, for PtRu(MgO)$_8$BM40h+lix and for PtRu(MgH$_2$)$_8$BM40h+lix, one may obtain specific surfaces of 23.90 and 43.98 m$^2$/g, respectively.

It is worth noting that one may find not only Pt crystallites, but also Ru crystallites. This is indicative that a nanocomposite was formed.

It is worth noting also that the size of the crystallite PtRuBM40h is reduced from 10.5 nm to 8.8 nm if use is made of the prior art process (example 1). One may also observe that the size of the crystallites of PtRuBM40h is reduced from 10.5 nm to 7.9 nm if these crystallites are dispersed by mechanical grinding of 20 hours with carbon black—see PtRuBM40h/XC-72 (20% wt PtRu/C)+BM40h (prior art, example 2). The size of the crystallites is then reduced to 5.4 nm if use is made of the process according to the invention to obtain PtRu(MgO)$_8$ BM40H/XC-72 (20% wt PtRu/C)+BM20H+lix. Thus, the process according to the invention permits to reduce the size of the crystallites more than any other process previously known, wether this process previously known is the one disclosed in example 1, where the type of the crystallites is reduced from 10.5 nm to 8.8 nm—PtRu(MgO)$_8$BM40h+lix—or, the one disclosed in example 2, where the size of the crystallites is reduced from 10.5 nm to 7.9 nm—PtRuBM40h/XC-72 (20% wt PtRu/C)+BM20h. Therefore, there is a synergetic effect when use is made of both processes.

The specific surface of the dispersed catalyst PtRu(MgO)$_8$BM40h/XC-72 (20% wt PtRu/C)+BM20h+lix according to the invention is 92.77 m$^2$/g whereas the one of the commercial catalyst PtRu/XC-72 20% by weight (E-Tek®) is 148.70 m$^2$/g. This difference of 50% is probably due to a reduction in the surface of the carbon black (XC-72R) during the mechanical grinding, probably due to a closing of some of the pores of the carbon black.

Figure 1B:
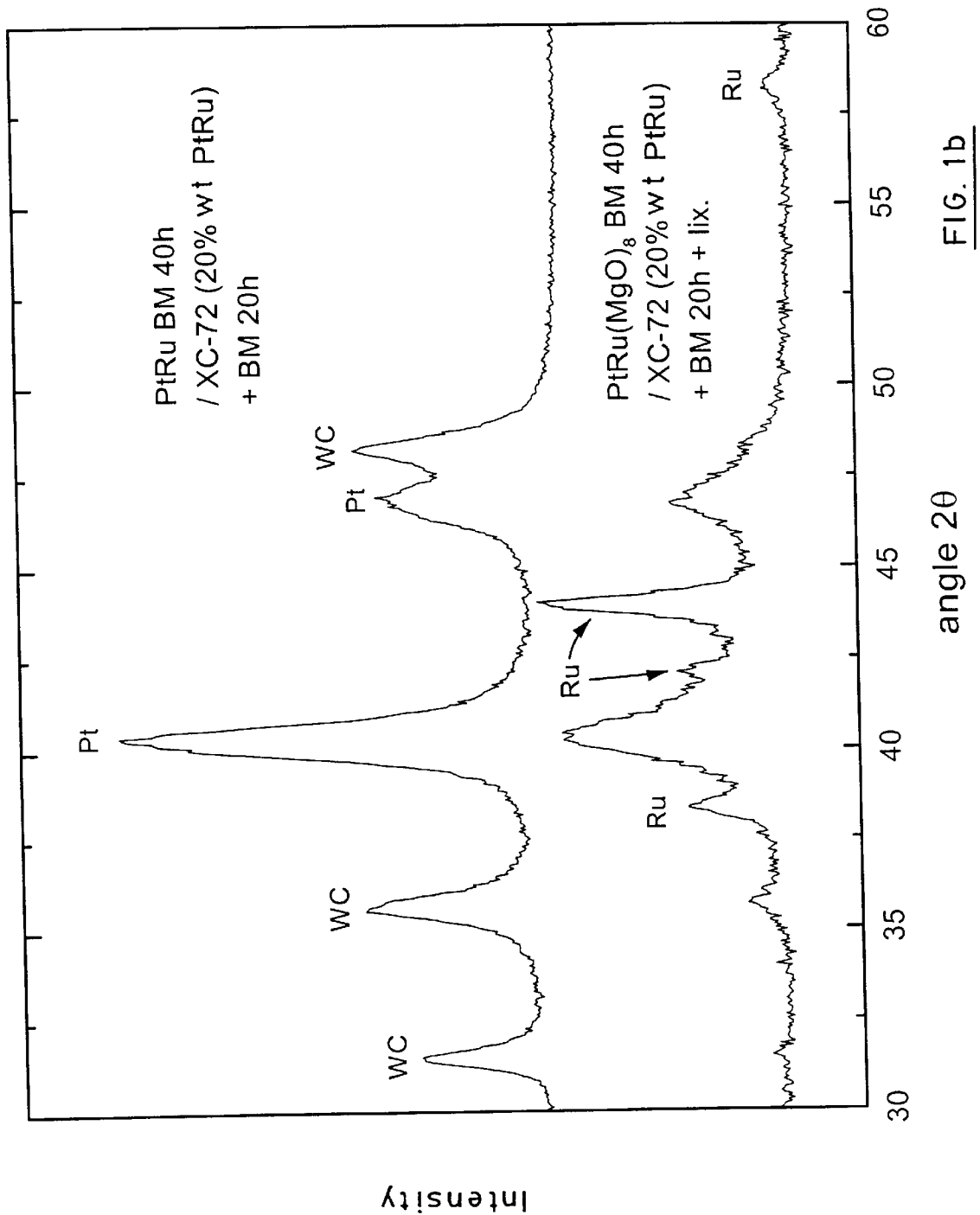
FIG. 1b is an X-ray diffraction diagram showing the Pt and Ru peaks of a Pt and Ru-containing catalyst supported on carbon black and prepared as described in comparative example 2 and the peaks of a catalyst of the same type supported on carbon black and prepared as disclosed in example 3.
Figure 2:
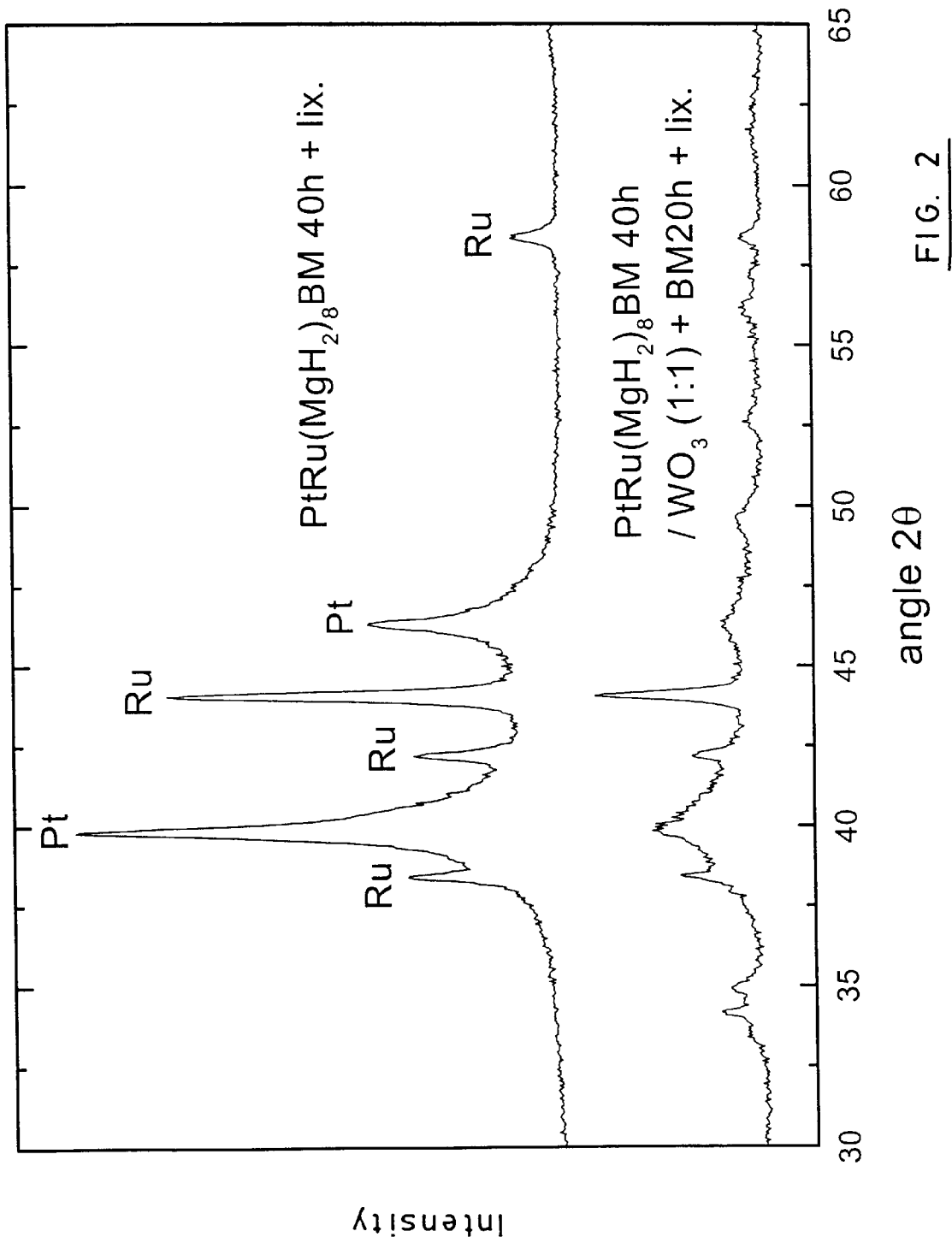
FIG. 2 is an X-ray diffraction diagram showing the Pt and Ru peaks of a Pt and Ru-containing catalyst prepared as disclosed in comparative example 1 and the peaks of a catalyst of the same type supported onto $WO_3$ and prepared as disclosed in example 5.

FIGS. 1a, 1b and 2 clearly show a widening of the peaks of Pt when a process according to the invention is used. In FIG. 1a, eventhough the signal intensity from the PtRu (MgO)$_8$BM40h/XC-72 (20% by weight of PtRu/C)+BM20h+lix according to the invention is smaller, the width at mid-height of the Pt peaks is larger than the one of PtRu(MgO)$_8$BM40h+lix, such being indicative that the size of the crystallites is lower. The same phenomena can be seen in FIG. 1b where the supported catalyst PtRuBM40h/XC-72 (20% wt PtRu/C)+BM20 has a main Pt peak whose width is smaller than that of the supported catalyst obtained by the process according to the invention, that is PtRu(MgO)$_8$ BM40h/XC-72 (20% wt PtRu/C)+BM20H+lix. A widening of the Pt peak is also observed when one compares PtRu/ MgH$_2$)$_8$BM40h+lix with PtRu(MgH$_2$)$_8$BM40h/WO$_3$ (1:1 at)+BM20h+lix (see FIG. 2). In this spectrum, one can notice the presence of numerous other peaks respectively associated to H$_2$WO$_4$.H$_2$O, WO$_3$.H$_2$O and H$_{0.12}$WO$_3$.2H$_2$O.

Assembly of Electrodes for Use in Fuel Cells

Tests were carried out onto the supported catalysts according to the invention. More particularly, tests were carried out in a fuel cell of 5 cm$^2$, provided by GlobeTech Inc In this cell, a membrane-electrodes assembly (MEA) prepared as follows was inserted.

A polymeric membrane of trademark Nafion® model 117 was obtained from DuPont. It was cut to measure 25 cm$^2$ and was cleaned using the following steps:

i) boiling for 1hour in H$_2$O$_2$ at 3% vol. (diluted with the deionized water, >10MΩcm);

ii) rinsing with deionized water;

iii) boiling for 1 hour in 0.1M of H$_2$SO$_4$;

iv) rising with deionized water; and v) boiling for 1 hour with deionized water.

The cathode was obtained from E-Tek. It was made of fabric impregnated with carbon black and small particles of Teflon®. A commercial electrocatalyst consisting of fine particles of Pt absorbed on carbon black was deposited on one surface of this cathode. This commercial catalyst is sold under trademark "catalysed Elat®" and comprises a load of 0.35 to 0.40 mg/cm$^2$ of Pt. A layer of soluble Nafion® was deposited onto the surface of the cathode and dried to obtain 0.6 mg of Nafion per cm$^2$.

The anode was prepared by manufacturing an ink containing the catalyst. This ink was deposited onto the surface of another fabric made of carbon impregnated with Teflon® but without catalyst deposited on it ("uncatalysed Elat®"). The ink was made to obtain a load of 4 mg/cm$^2$ of catalyst.

By way of comparison, an ink was prepared by ultrasonic stirring in a closed bottle for 40 to 50 minutes, of 40 mg of the same catalyst, 150 μL of Nafion® in solution (Aldrich, 5 wt %), 100 μL of deionized water, 300 μL of methanol (electronic grade) and 60 μL of glycerine. 305 μL of this solution was picked up and deposited onto the surface of a carbon fabric. This electrode was then dried under vacuum for 2 hours at about 100° C.

In the case of the catalyst dispersed with carbon black, the load was about 0.4 mg/cm$^2$. The ink was prepared by ultrasonic stirring in a closed bottle for 40 to 50 minutes, of 17.5 mg of a catalyst, 370 μL of Nafion® in solution, 200 μL of methanol (electronic grade) and 60 μL of glycerine. 315 μL of this solution was picked up and deposited onto the surface of a carbon fabric. This electrode was then dried under vacuum for 2 hours at about 100° C.

The membrane was pressed between the anode and cathode by means of a hot-press at 140° C. for 40 seconds under a pressure of 2500 pounds.

The operating conditions of the fuel cell were as follows:

$T_{cell}$=80° C.

$T_{H2O}$=110° C. (hydrogen and oxygen)

flow rate=0.2 SLM (hydrogen and oxygen)

$P_{oxygen}$=60 psig $P_{hydrogen}$30 psig

The tests were carried out with pure hydrogen and pure oxygen. After the tests under pure hydrogen, a mixture of hydrogen with 100 ppm of CO was used for verifying the tolerance of the catalyst to CO. This mixture was flown through the cell in an open circuit for 30 minutes before the first measurements.

Analysis of the Results Obtained in a Fuel Cell

Figure 3:
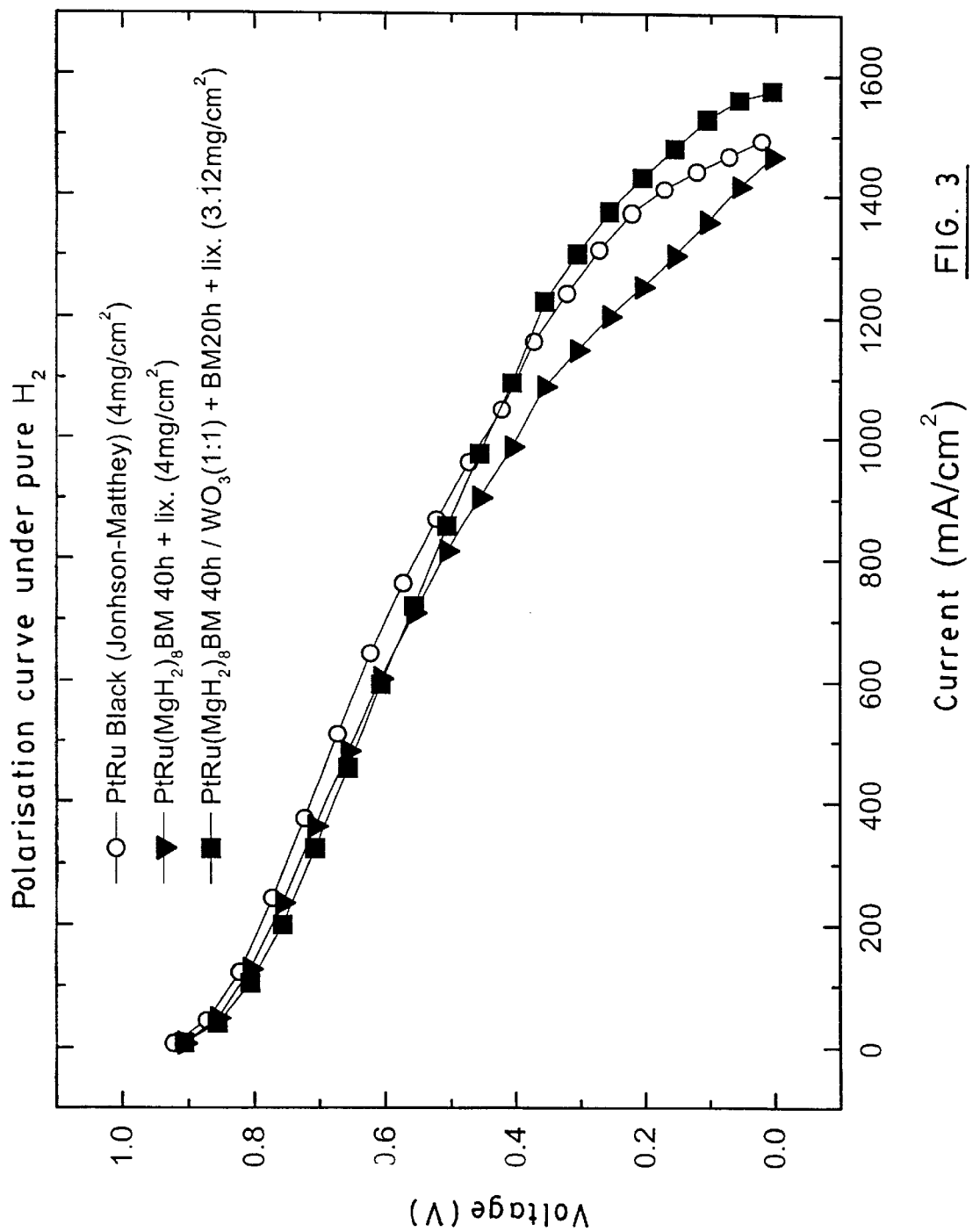
FIG. 3 shows polarization curves under a pure $H_2$ atmosphere of a $PtRu(MgH_2)_8BM40h/WO_3(1:1at)+BM20h+lix$ prepared as disclosed in example 3, of $PtRu(MgH_2)_8BM40h+lix$ as prepared in example 1 and a PtRuBlack (Johnson-Matthey®).

FIG. 3 shows the polarization curves obtained under a pure H$_2$ atmosphere with PtRu(MgH$_2$)$_8$BM40h/WO$_3$ (1:1 at)+BM20h+lix. (example 5) as compared to PtRu(MgH$_2$)$_8$ BM40h+lix. (prior art—example 1) and to PtRuBlack (Johnson-Mattey). The latter has a slightly better activity than the other two. However, since the load of the catalyst is the same for all the anodes that were tested, there is 22% less PtRu by weight in the PtRu(MgH$_2$)$_8$BM40/WO$_3$(1:1 at)+MB20h+lix. according to the invention than in the other catalysts. Therefore, with the invention, one may substantially reduce the amount of noble metals that are used while keeping approximately the same catalytic activity.

Figure 4:
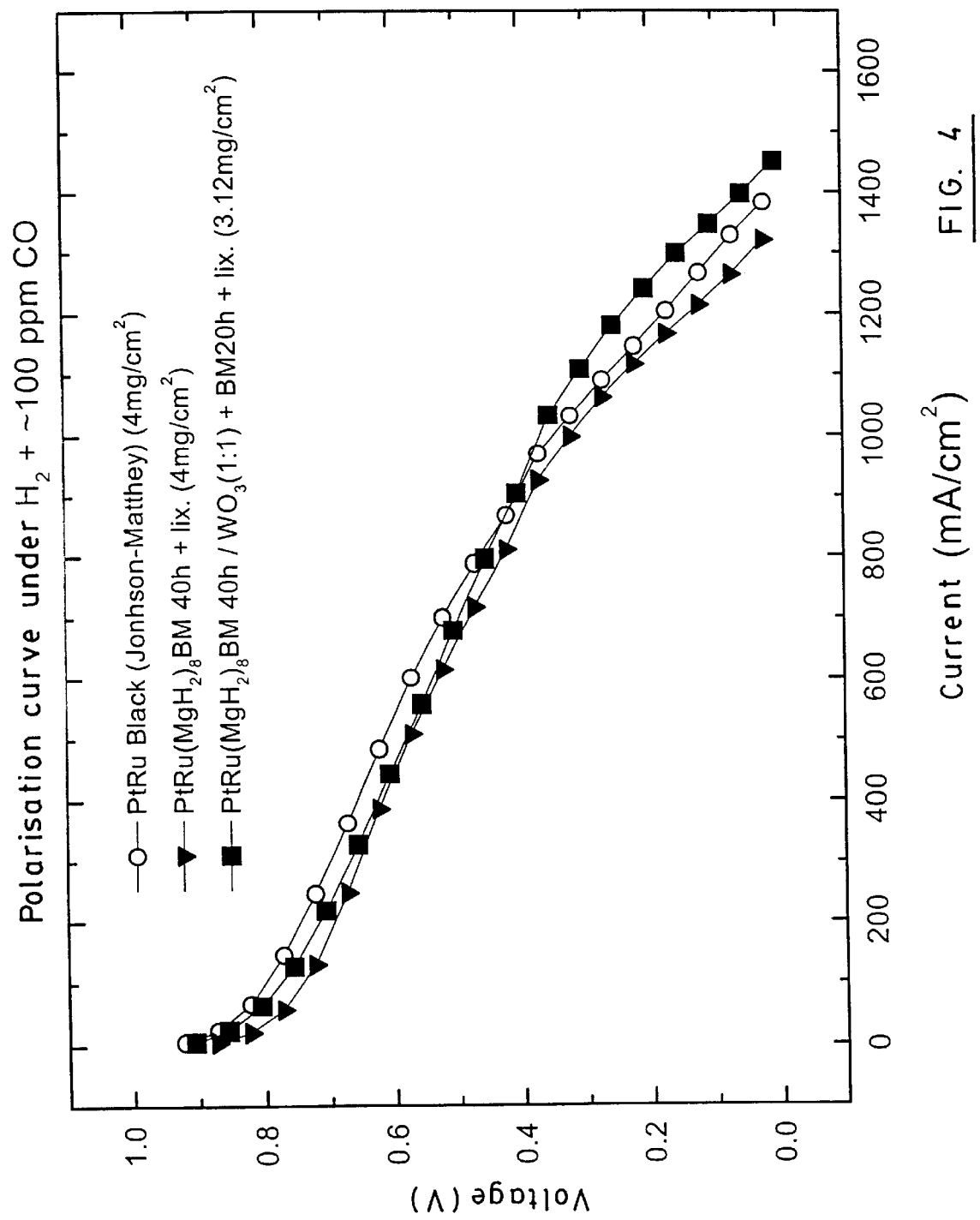
FIG. 4 shows polarization curves under an atmosphere of $H_2+100$ ppm CO of the very same catalysts as in FIG. 3.

FIG. 4 shows the polarization curves obtained under an atmosphere of H$_2$+100 ppm of CO with the very same catalysts. All of them suffer from the presence of CO but they all have substantially the same efficiency. Once again, there is less PtRu by weight in the PtRu(MgH$_2$)$_8$BM40h/WO$_3$ (1:1 at)+BM20h+lix. according to the invention than in the other catalysts.

Figure 5:
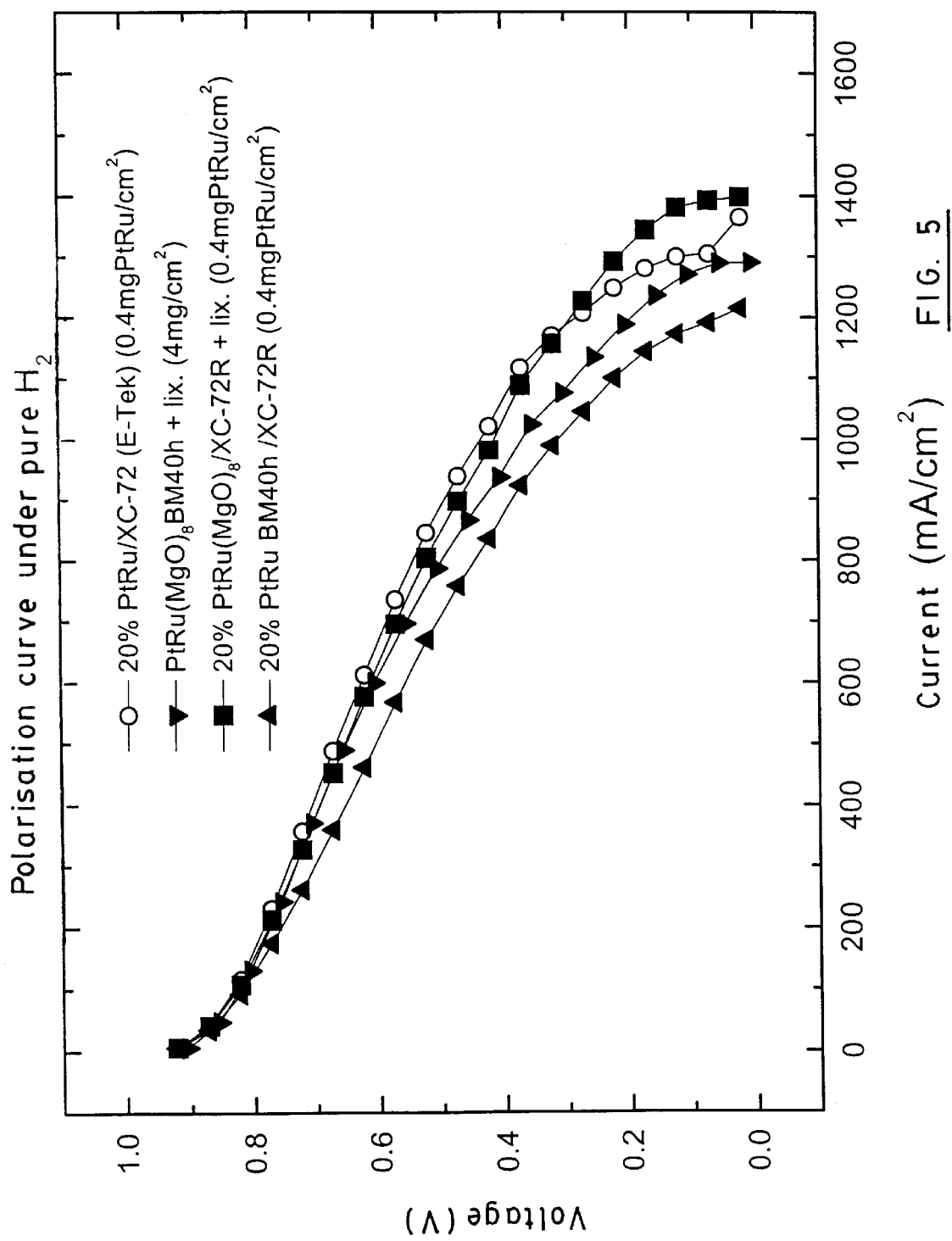
FIG. 5 shows polarization curves obtained under a pure $H_2$ atmosphere of a 20% $PtRu(MgO)_8BM40h/XC-72R+lix$ as prepared in example 3, a $PtRu(MgO)_8BM40h+lix$ as prepared in example 1, a 20% PtRuBM40h/XC-72R as prepared in example 2, and a 20% PtRu/XC-72(E-Tek®).

FIG. 5 shows the polarization curves obtained under pure H$_2$ with 20% PtRu(MgO)$_8$BM40h/XC-72R+lix. as compared to PtRu(MgO)$_8$BM40h+lix., 20% PtRuBM40h/XC-72R (prior art—example 2) and 20% PtRu/XC-72 (E-Tek®). As can be noticed, the catalytic activities of these products are relatively comparable, especially when the voltage is higher than 0.5V. Once again, 20% PtRu(MgO)$_8$BM40h/XC-72R+lix. uses less PtRu than PtRu(MgO)$_8$BM40h+lix. for the same results.

Figure 6:
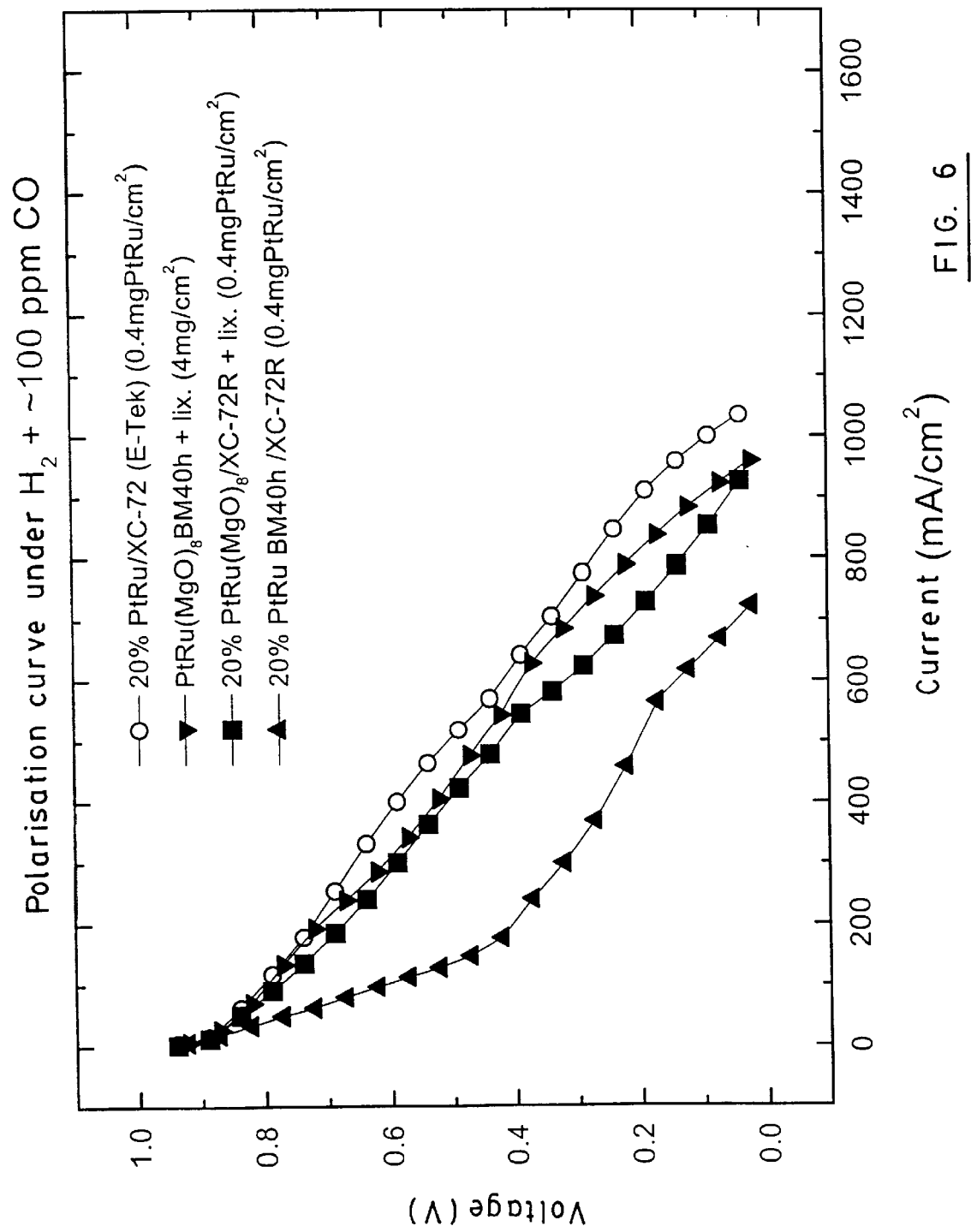
FIG. 6 shows polarization curves under an atmosphere of $H_2+100$ ppm CO of the same catalysts as in example 5.

FIG. 6 shows the polarization curves obtained under an atmosphere of H$_2$+100 ppm of CO, with the same catalysts. At 0.5V, the commercial catalyst 20% PtRu/XC-72 (E-Tekg®) is slightly less affected than the other two eventhough these catalysts have a very similar behaviour. Once again, there is a substantial reduction in the amount of PtRu in the 20% PtRu(MgO)$_8$BM40h/XC-72R+lix. according to the invention, as compared to PtRu(MgO)$_8$BM40h+lix. (prior art—example 1). Moreover, the 20% PtRuBM40h/XC-72R (prior art—example 2) shows an efficiency substantially lower than those obtained with the other catalysts. This is illustrative that, at equal PtRu concentration, the new process of preparation is advantageous, as compared to the one of the prior art—example 2.

Figure 7:
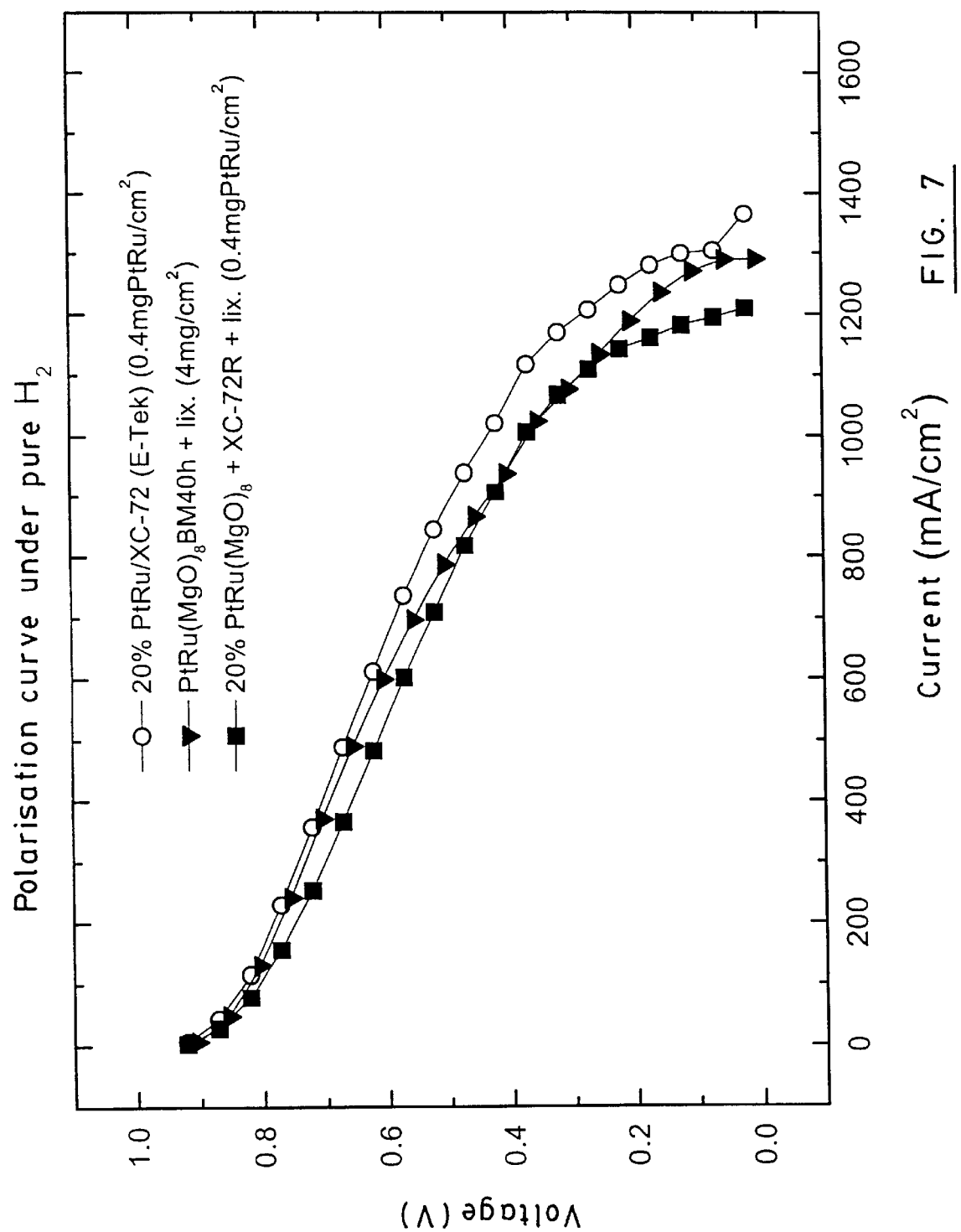
FIG. 7 shows polarization curves under a pure $H_2$ atmosphere of a 20% $PtRu(MgO)_8BM40h+XC-72R+lix$ as disclosed in example 3, a $PtRu(MgO)_8BM40h+lix$ prepared as disclosed in comparative example 1, and a 20% PtRu/XC-72(E-Tek®).

FIG. 7 shows the polarization curves obtained under a pure H$_2$ atmosphere for the 20% PtRu(MgO)$_8$BM40h+XC-72R+lix. according to the invention as compared to PtRu(MgO)$_8$BM40h+lix. and 20% PtRu/XC-72 (E-Tek®). The catalytic activities of these catalysts being substantially similar, it can be deduced that the process according to the invention where the non-leachable components are added during the lixiviation step gives products which are comparable to the products obtained by the process according to the invention where the non-leachable components are admixed with the others (compare FIG. 5 with FIG. 7).

Figure 8:
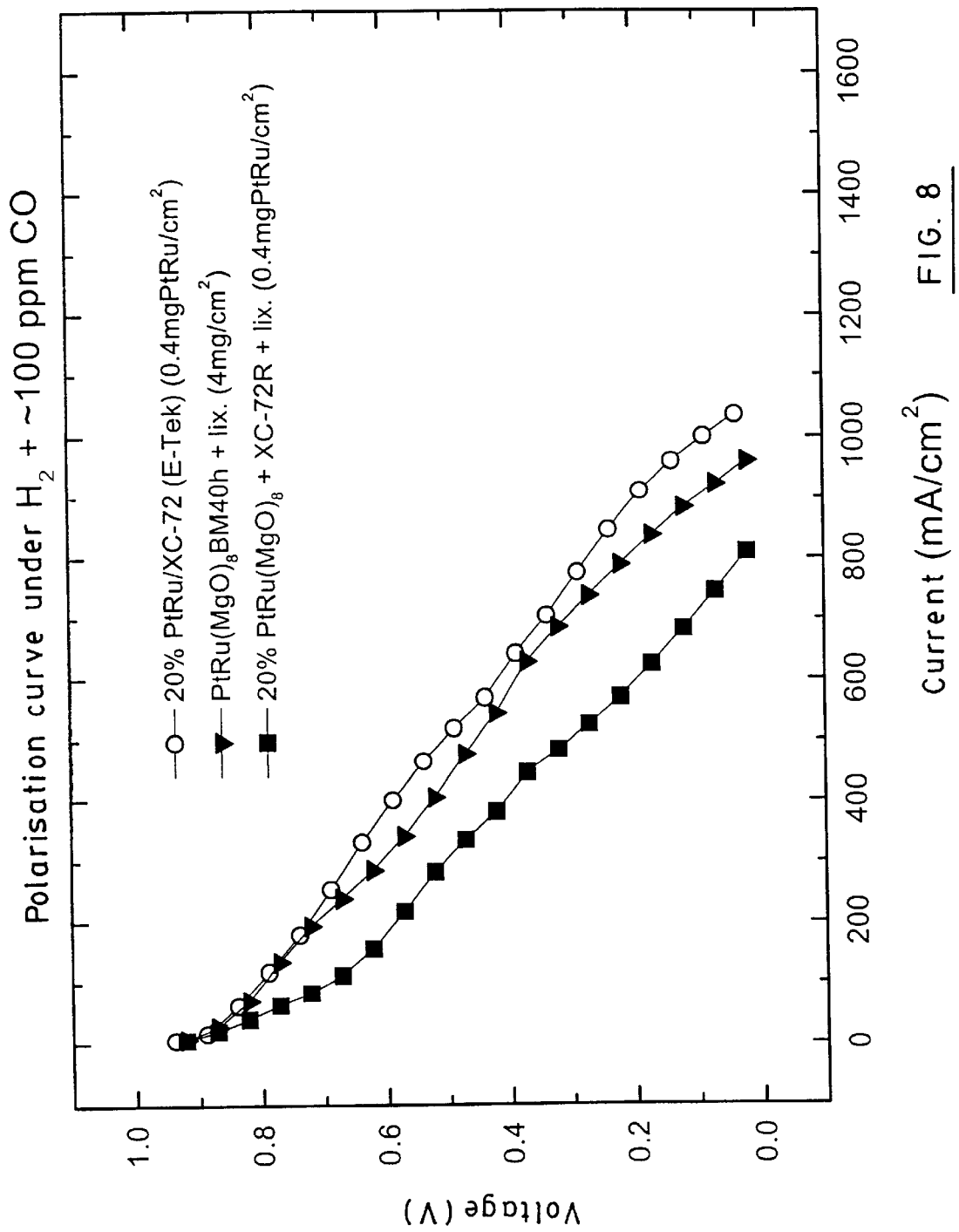
FIG. 8 shows polarization curves under an atmosphere of $H_2+100$ ppm CO of the same catalysts as in example 7.

FIG. 8 shows the polarization curves obtained under an atmosphere of H$_2$+100 ppm of CO, with the very same catalysts. At 0.5V, the 20% PtRu(MgO)$_8$BM40h+XC-72R+lix. according to the invention gives results that are much less efficient than those reported in FIG. 6. Nevertheless, these results once again are indicative that the preparation of the process is valuable.

Analysis of the Results Obtained by Scanning Electron Microscope

Products prepared in the examples were analysed with a scanning electron microscope Hitachi® S-4700.

Figure 9:
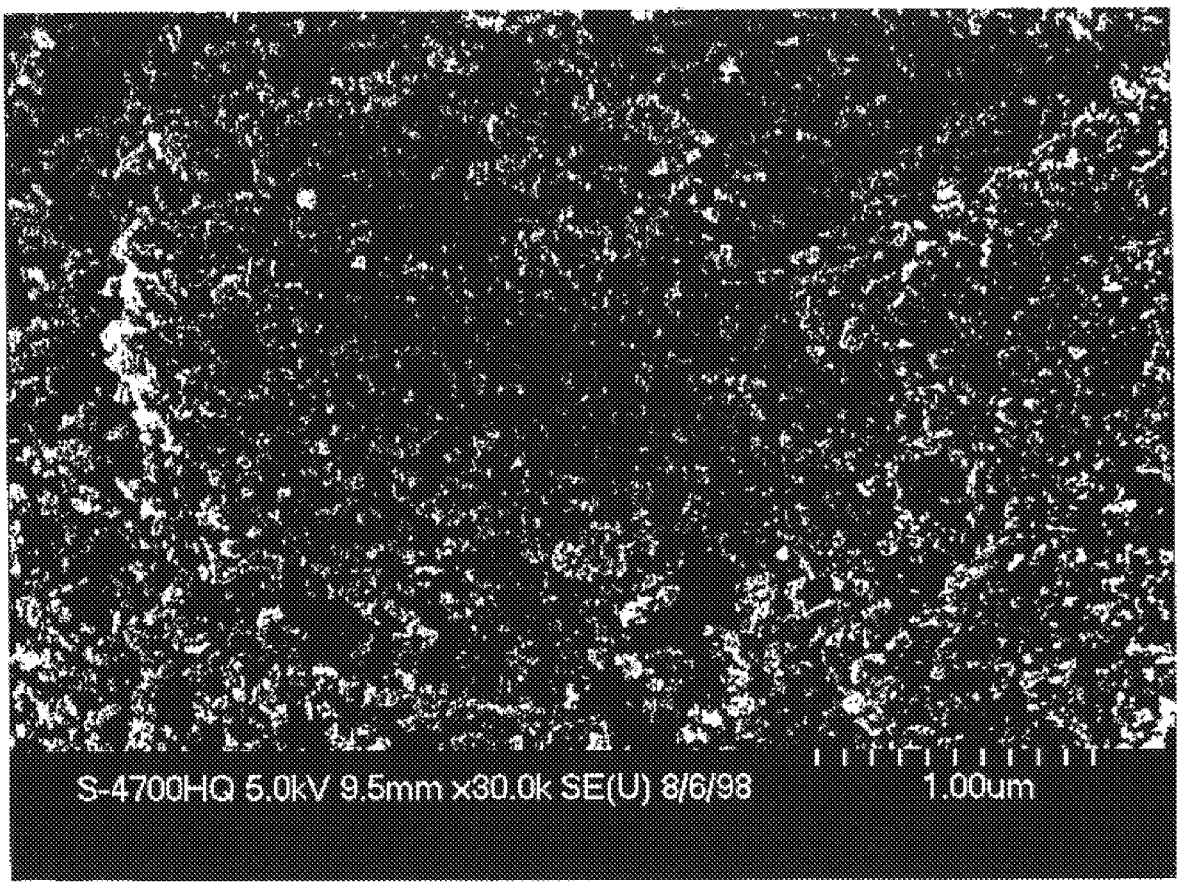
FIG. 9 is a photograph obtained by scanning electron microscopy of the surface of a sample of the prior art, $PtRu(MgO)_8BM40h+lix$, at an enlargement of 30,000 in secondary electron mode.
Figure 10:
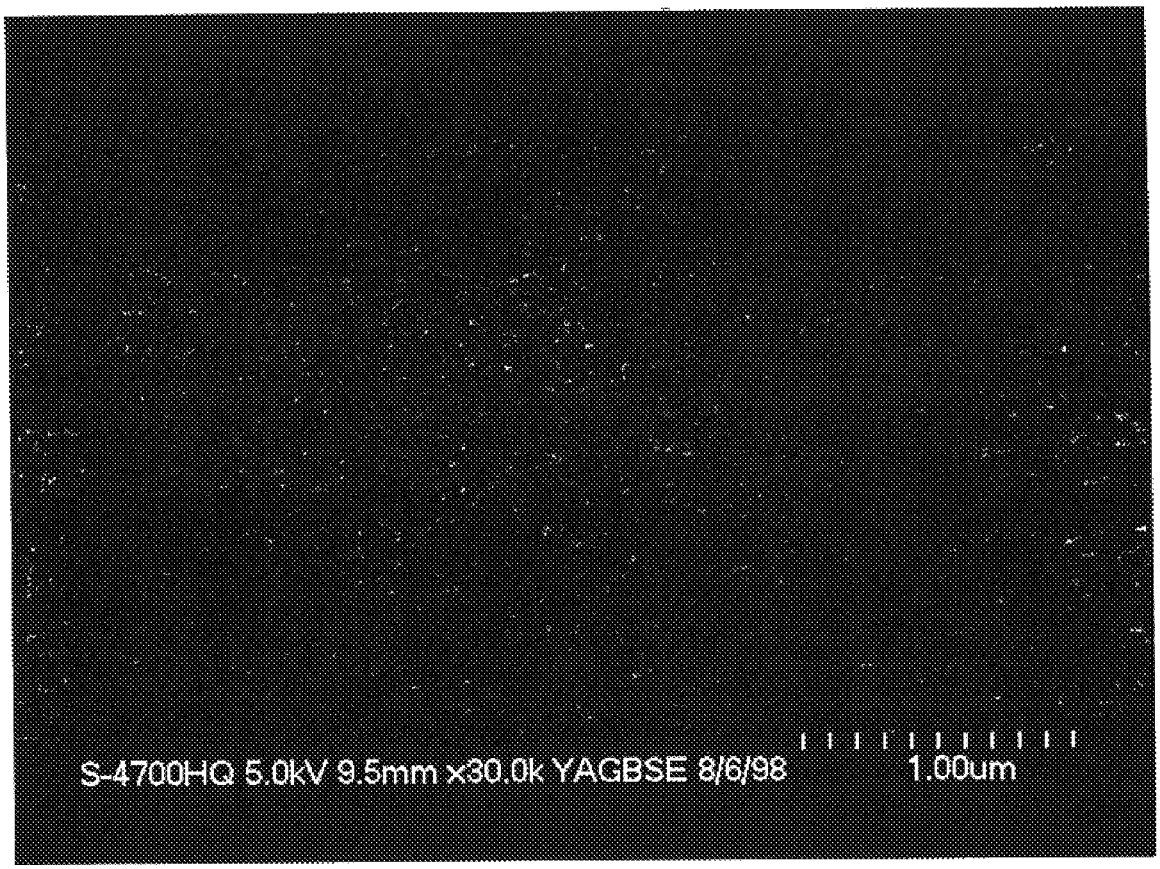
FIG. 10 is a photograph similar to the one of FIG. 9, but in backscattered electron mode.

FIG. 9 shows the surface of a sample of the prior art catalyst PtRu(MgO)$_8$BM40h+lix. (example 1), at a magnitude of 30,000, taken in the secondary electrode mode. The surface of this catalyst is very porous and the average dimension of the pore is clearly lower than 1 μm. FIG. 10 is identical, but taken in the backscattered electron mode. The uniformity of intensity is indicative of an homogenous chemical composition.

Figure 11:
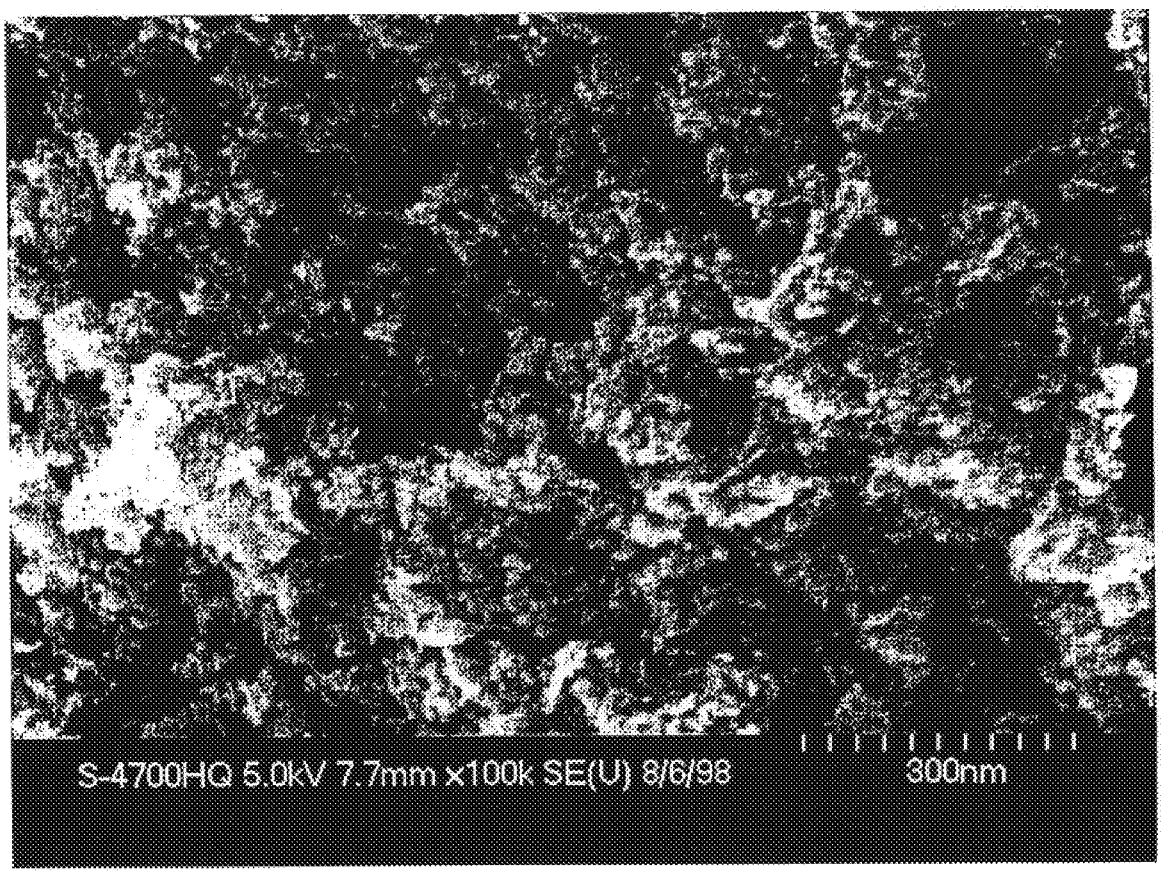
FIG. 11 is a photograph of the surface of the same sample $PtRu(MgO)_8BM40h+lix$, at an enlargement of 100,000, in secondary electron mode.

FIG. 11 shows the surface of the same catalyst PtRu(MgO)$_8$BM40h+lix. at a magnitude of 100,000, in the secondary electron mode. As can be seen, there is a great number of pores of about 10 nm or less. Accordingly, the structure of the product is like a sponge with nanometric pores.

Figure 12:
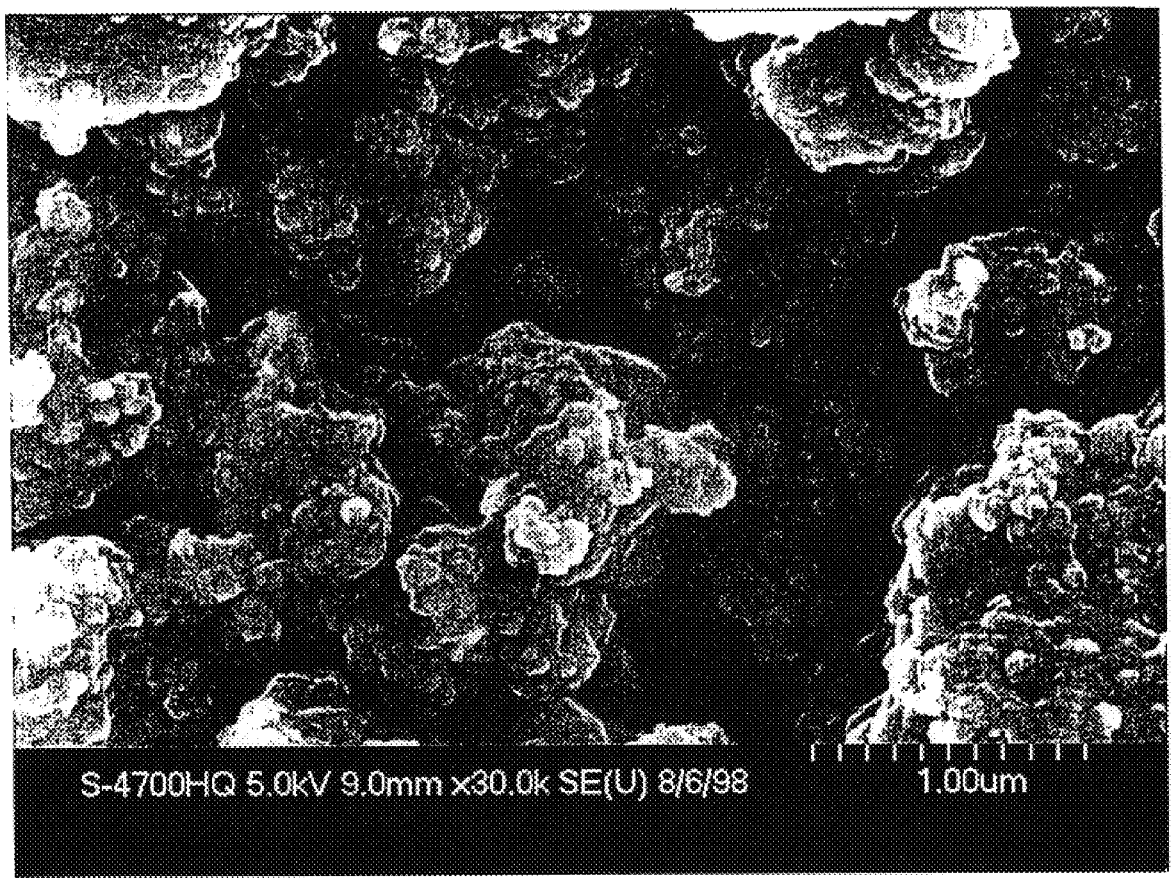
FIG. 12 is a photograph of the surface of the sample of 20% $PtRu(MgO)_8BM40h/XC-72R+lix$, at an enlargement of 30,000, in secondary electron mode.
Figure 13:
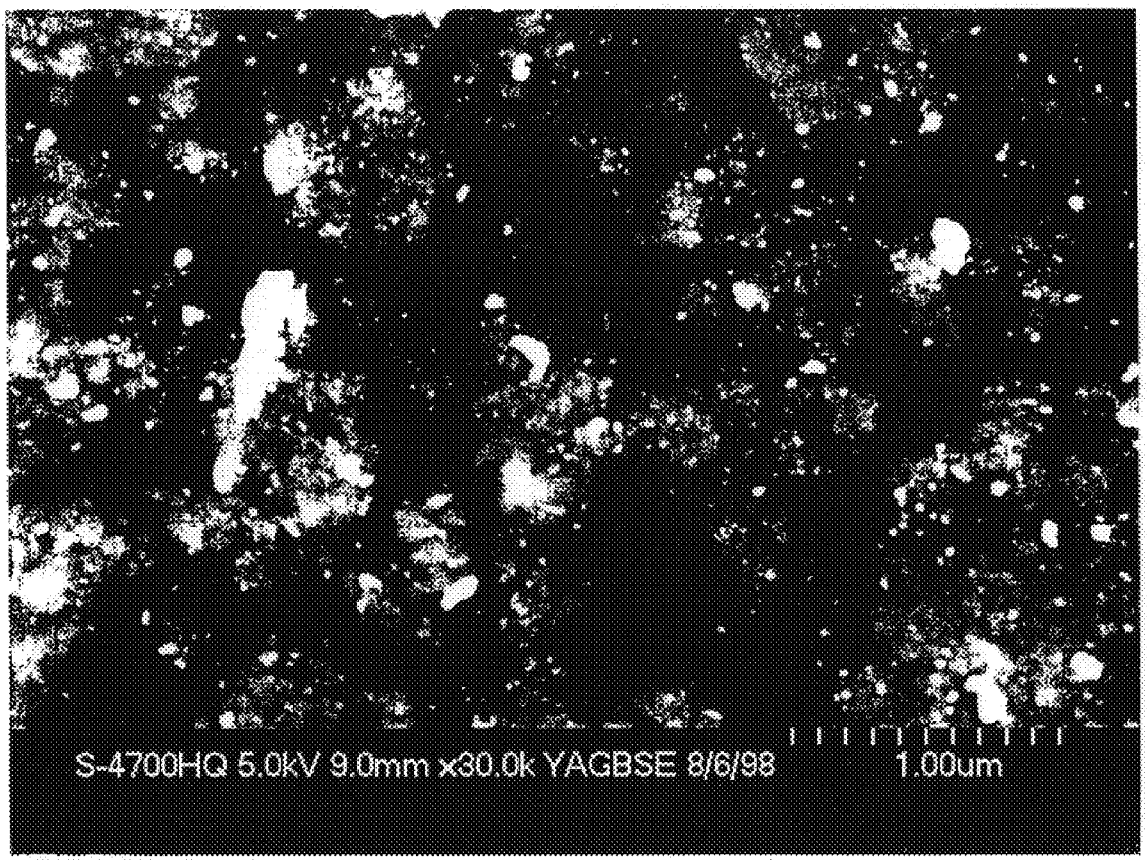
FIG. 13 is a photograph similar to the one of FIG. 12 but in backscattered electron mode.

FIG. 12 shows the surface of the 20% PtRu(MgO)$_8$BM40h/XC-72R+lix according the invention (example 3) at a magnitude of 30,000, in the secondary electron mode. As can be seen, the presence of carbon black (XC-72R) drastically modifies the morphology. Indeed, contrary to what is shown in FIG. 9 where only a nanocomposite of Pt—Ru is present, one can only see the round shape of carbon black. When the same picture is taken in the backscattered electron mode (see FIG. 13), the particles of Pt and Ru appear, because they are much more "heavy" than the carbon. The size of these particles ranges from a micrometer to much smaller size. There are dispersed onto the carbon black.

Figure 14:
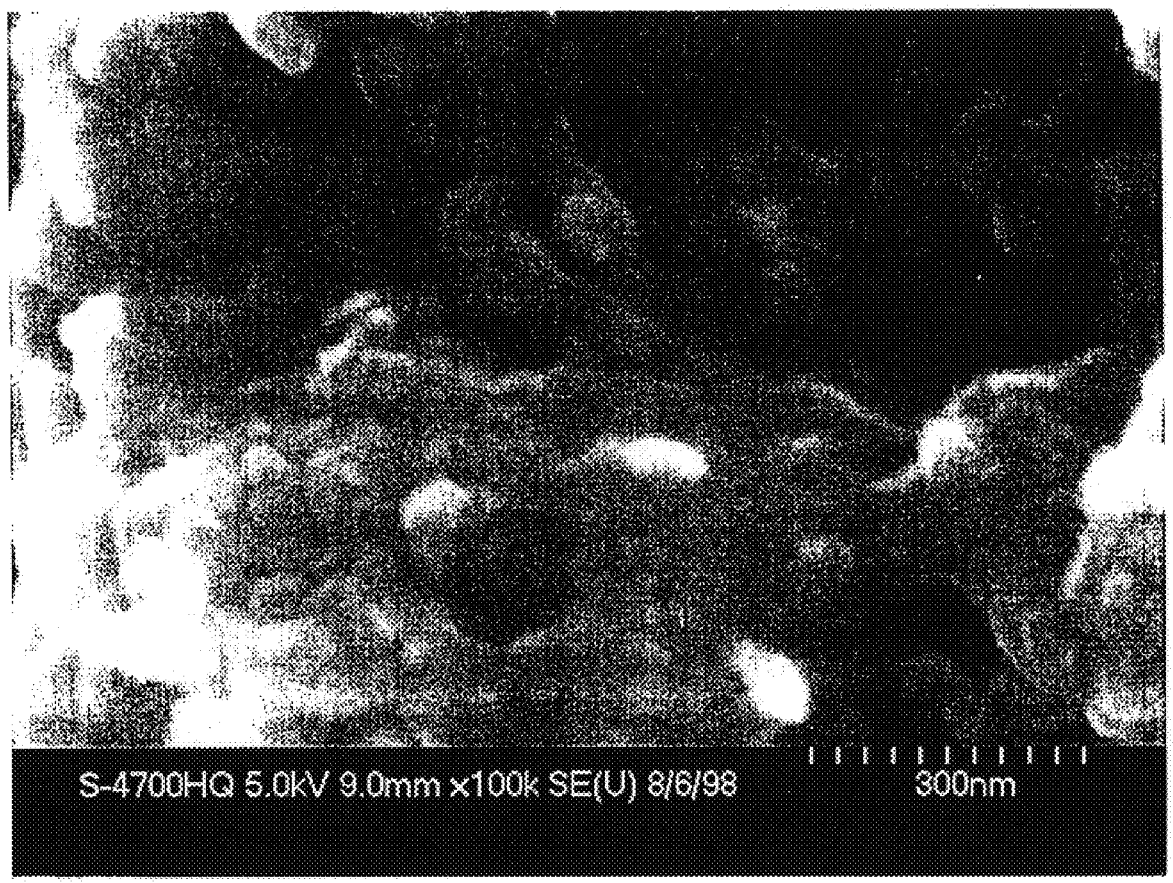
FIG. 14 is a photograph of the surface of the same sample 20% $PtRu(MgO)_8BM40h/XC-72R+lix$, at a enlargement of 100,000, in secondary electron mode.
Figure 15:
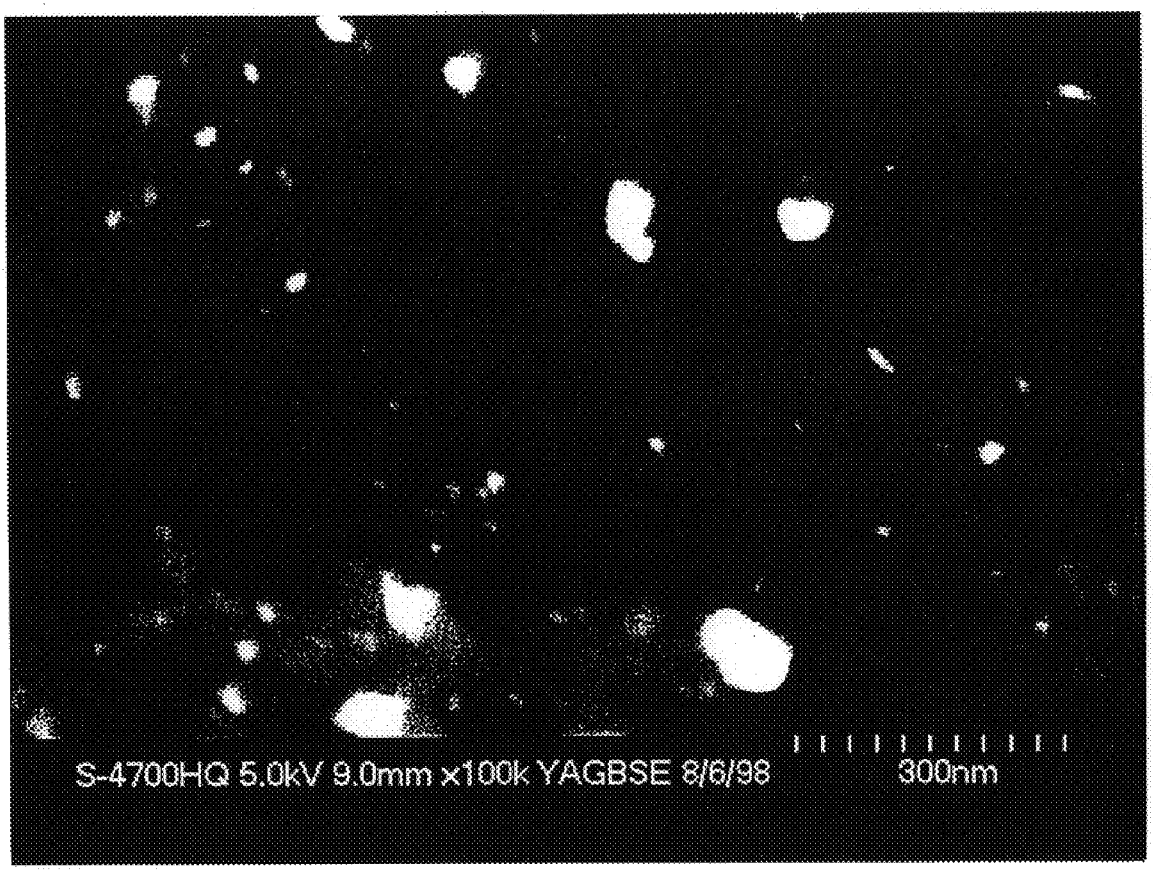
FIG. 15 is a photograph similar to the one of FIG. 14 but in bacscattered electron mode.

FIG. 14 shows the surface of the same catalyst PtRu(MgO)$_8$BM40h/XC-72R+lix at a magnitude of 100,000 in the secondary electron mode. The rounded shape of the carbon black is still visible. In the backscattered electron mode (see FIG. 15), the particles of Pt and Ru are clearly visible and are of a size of 10 nm or less. These particles are dispersed onto the carbon black. Thus, one can see that the particles are of the size of the crystallites, that is of about 5 μm, as measured in XRD. This is indicative that the process of preparation according to the invention permits to separate the crystallites from each other.

What is claimed is:

1. Process for the preparation of a supported catalyst having a nanocrystalline structure and a high specific surface area, comprising:

in a first step, preparing by mechanical grinding a nanocrystalline material consisting of a metastable composite or alloy of at least two different chemical elements or compounds containing at least one catalytic species, the so-prepared material having a nanocrystalline structure with crystallite of a size lower than 100 nm; and in a second step, subjecting said nanocrystalline material to leaching with a leaching solution in order to eliminate totally or partially at least one of said elements or compounds of the material other than the said at least one catalytic species, wherein at least one further chemical element or compound that is non-leachable and acts as a support for the at least one catalytic species, is added to the material during the first step or to the leaching solution during the second step.

2. The process of claim 1, wherein the at least one non-leachable element or compound acting as a support has a high specific surface area and a high electronic conduction.

3. The process of claim 1, wherein the at least one non-leachable element or compound acting as a support is selected from the group consisting of carbon black, graphite, doped zeolite, pyrolized polyacrylonitrile, carbides and oxides.

4. The process of claim 1, wherein the at least one non-leachable element or chemical compound acting as a support has a high specific surface area and an ionic conduction.

5. The process of claim 1, wherein the at least one non-leachable element or compound acting as a support is selected from the group consisting of conductive ionomeric polymers and ion-conducting ceramics.

6. The process of claim 1, wherein said at least one non-leachable element or compound acting as a support is in a form selected from the group consisting of powders, grids, lamella, films and plates.

7. The process of claim 1, wherein said at least one catalytic species contain at least one element selected from the group consisting of Pd, Pt, Ir, Os, Au, Rh, Ag, Ru and Ni.

8. The process of claim 1, wherein:
the at least one element or compound leached in the second step comprises at least one non-metallic element selected from the group consisting of H, C, N, O, F, Cl, P and S; and
the leaching of said at least one element or compound is carried out by thermal decomposition or by reaction with another phase.

9. The process of claim 1, wherein:
the at least one chemical element or compound leached in the second step is selected from the group consisting of Mg, Li, Na, K, Ca, Ti, Zr, Zn, H, C, N, O, F, Cl, P and S; and
the leaching of said at least one element or compound is carried out by thermal decomposition or by reaction with another phase.

10. The process of claim 1, wherein said at least one chemical element or compound leached in the second step has a molar concentration which, prior to the leaching, ranges between 2% and 95% with respect to all the chemical elements or compounds used in the process.

11. The process of claim 1, wherein, in the first step, the nanocrystalline material is prepared in the form of a powder by mixing all the chemical elements or compounds used as starting materials, and subjecting all of said elements or compounds to a single mechanical grinding.

12. The process of claim 1, wherein, in the first step:
all the chemical elements or compounds used as starting materials are mixed together except said at least one element or compound acting as a support, in order to obtain a first mixture that is subjected to a first mechanical grinding; and
said at least one compound or element acting as a support is added to obtain a second mixture that is subjected to a second mechanical grinding.

13. The process of claim 1, wherein, in the first step:
all the chemical elements and compounds used as starting materials except said at least one element or compound acting as a support and said at least one leachable element or compound, are mixed together in order to obtain a first mixture that is subjected to a first mechanical grinding;
said at least one leachable element or compound is added to the first mixture that is obtained after grinding in order to obtain a second mixture that is subjected to a second mechanical grinding; and
said at least one element or compound acting as a support is added to the second mixture that is obtained after grinding in order to obtain a third mixture that is subjected to a third mechanical grinding.

14. The process of claim 1, wherein:
said at least one element or compound acting as a support is added only during the second step via the leaching solution; and
the leaching solution is subjected to a mechanical, magnetic or ultra-sonic stirring.

15. The process of claim 1, wherein said at least one element or compound acting as a support is used in such an amount that a molar concentration of said at least one element or compound acting as a support in the supported catalyst that is prepared, is higher than 50%.

* * * * *

UNITED STATES PATENT AND TRADEMARK OFFICE
CERTIFICATE OF CORRECTION

PATENT NO.     : 6,239,065 B1
DATED          : May 29, 2001
INVENTOR(S)    : Robert Schulz et al.

It is certified that error appears in the above-identified patent and that said Letters Patent is hereby corrected as shown below:

<u>Title page,</u>
Item [75], change the spelling of the name of the fourth inventor from "Jean-Pol Dödelet" to -- Jean-Pol Dodelet --.
Item [57], ABSTRACT,
Line 9, delete the first occurrence of the word "of".

<u>Column 2,</u>
Line 60, change "nanocristallities" to -- nanocrystallites --.

<u>Column 6,</u>
Line 47, change "obserbved" to -- observed --.

<u>Column 7,</u>
Line 47, change "1except" to -- 1 except --.

<u>Column 8,</u>
Line 38, change "PtMN40h" to -- PtBM40h --.
Line 67, change "(0.25 m$^2$/g" to -- (0.25 m$^2$g) --.

<u>Column 9,</u>
Line 13, change "1which" to -- 1 which --.

<u>Column 10,</u>
Line 47, change "140º C." to -- 140º C --.

Signed and Sealed this

Eighteenth Day of June, 2002

*Attest:*

*Attesting Officer*

JAMES E. ROGAN
*Director of the United States Patent and Trademark Office*